(12) United States Patent
Myerberg et al.

(10) Patent No.: US 10,639,716 B2
(45) Date of Patent: May 5, 2020

(54) PNEUMATIC JETTING OF METAL FOR ADDITIVE MANUFACTURING

(71) Applicant: Desktop Metal, Inc., Burlington, MA (US)

(72) Inventors: Jonah Samuel Myerberg, Lexington, MA (US); Toshana Krishna Natchurivalapil Rappai James, Somerville, MA (US); Emanuel Michael Sachs, Newton, MA (US); Paul A. Hoisington, Hanover, NH (US); Kevin Michael Li, Brighton, MA (US)

(73) Assignee: Desktop Metal, Inc., Burlington, MA (US)

( * ) Notice: Subject to any disclaimer, the term of this patent is extended or adjusted under 35 U.S.C. 154(b) by 371 days.

(21) Appl. No.: 15/449,543

(22) Filed: Mar. 3, 2017

(65) Prior Publication Data
US 2017/0252808 A1    Sep. 7, 2017

Related U.S. Application Data

(60) Provisional application No. 62/303,324, filed on Mar. 3, 2016.

(51) Int. Cl.
*B33Y 10/00* (2015.01)
*B33Y 30/00* (2015.01)
(Continued)

(52) U.S. Cl.
CPC .............. *B22F 3/115* (2013.01); *B22F 3/008* (2013.01); *B22F 3/1055* (2013.01); *B33Y 10/00* (2014.12);
(Continued)

(58) Field of Classification Search
CPC .............................. B33Y 30/00; B33Y 10/00
See application file for complete search history.

(56) References Cited

U.S. PATENT DOCUMENTS 6,446,878 B1    9/2002  Chandra et al.
2005/0220994 A1  10/2005  Mehta et al.
(Continued)

FOREIGN PATENT DOCUMENTS

WO    WO 2017152104    9/2017

OTHER PUBLICATIONS

ISA, "PCT Application No. PCT/US17/20751 International Search Report and Written Opinion dated Aug. 16, 2017", 14 pages.

*Primary Examiner* — Scott R Kastler
(74) *Attorney, Agent, or Firm* — Wiggin and Dana LLP; Jonathan D. Hall; Joseph Casino

(57) ABSTRACT

Devices, systems, and methods are directed to the pneumatic ejection of liquid metal from a nozzle moving along a controlled three-dimensional pattern to fabricate a three-dimensional object through additive manufacturing. The metal is movable into the nozzle as a valve is actuated to control movement of pressurized gas into the nozzle. Such movement of metal into the valve as pressurized gas is being moved into the nozzle to create an ejection force on liquid metal in the nozzle can reduce or eliminate the need to replenish a supply of the metal in the nozzle and, therefore can facilitate continuous or substantially continuous liquid metal ejection for the fabrication of parts.

18 Claims, 8 Drawing Sheets

(51) Int. Cl.
*B22F 3/115* (2006.01)
*B22F 3/105* (2006.01)
*B22F 3/00* (2006.01)
*B33Y 50/02* (2015.01)

(52) U.S. Cl.
CPC ........... *B33Y 30/00* (2014.12); *B22F 2999/00* (2013.01); *B33Y 50/02* (2014.12)

(56) References Cited

U.S. PATENT DOCUMENTS

| | | |
|---|---|---|
| 2006/0198959 A1 | 9/2006 | Murata et al. |
| 2006/0249485 A1 | 11/2006 | Partanen et al. |
| 2012/0251688 A1 | 10/2012 | Zimmerman et al. |
| 2012/0251689 A1 | 10/2012 | Batchelder et al. |
| 2013/0287934 A1 | 10/2013 | Ramsundar et al. |
| 2013/0333798 A1 | 12/2013 | Bosveld et al. |
| 2017/0252808 A1* | 9/2017 | Myerberg .............. B33Y 10/00 |
| 2017/0252809 A1 | 9/2017 | Myerberg et al. |
| 2017/0252810 A1 | 9/2017 | Myerberg et al. |
| 2017/0252811 A1 | 9/2017 | Myerberg et al. |

* cited by examiner

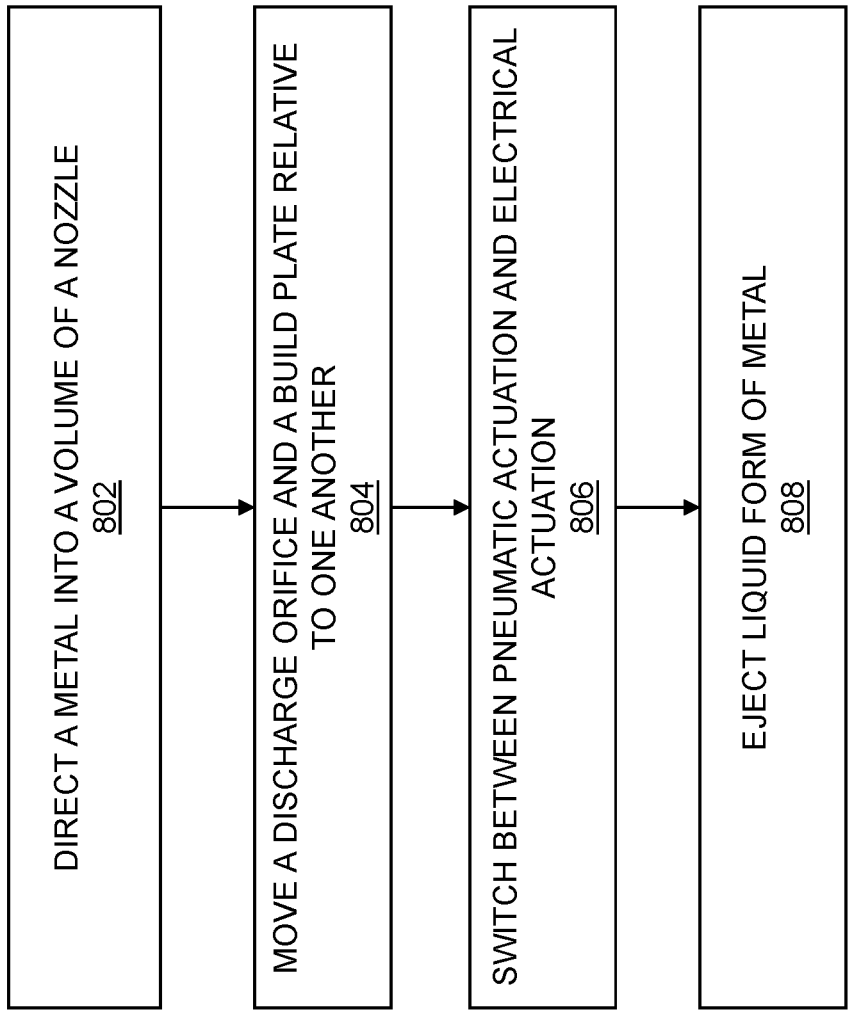

PNEUMATIC JETTING OF METAL FOR ADDITIVE MANUFACTURING

CROSS-REFERENCE TO RELATED APPLICATIONS

This application claims the benefit under 35 § 119(e) of U.S. Prov. App. No. 62/303,324, filed on Mar. 3, 2016, the entire contents of which are hereby incorporated herein by reference.

FIELD

The devices, systems, and methods described herein relate to additive manufacturing, and more specifically to a pneumatic drive system for additive manufacturing with metallic materials.

BACKGROUND

Pneumatic jetting can be used to drive droplets of metal with pressurized air or gas. Such droplets can be accumulated to form an object. While pneumatic jetting can impart forces to liquid metal to form a metallic object, considerations related to speed, accuracy, control, and material properties present challenges for the use of pneumatic forces for object formation on a large scale. Accordingly, there remains a need for commercially viable techniques for additive manufacturing of metal using pneumatic forces.

SUMMARY

Devices, systems, and methods are directed to the pneumatic ejection of liquid metal from a nozzle moving along a controlled three-dimensional pattern to fabricate a three-dimensional object through additive manufacturing. The metal is movable into the nozzle as a valve is actuated to control movement of pressurized gas into the nozzle. Such movement of metal into the valve as pressurized gas is being moved into the nozzle to create an ejection force on liquid metal in the nozzle can reduce or eliminate the need to replenish a supply of the metal in the nozzle and, therefore can facilitate continuous or substantially continuous liquid metal ejection for the fabrication of parts.

An additive manufacturing system may include a nozzle defining a volume and a discharge orifice in fluid communication with one another, a source of a pressurized gas, a valve actuatable to control fluid communication between the source of pressurized gas and the volume of the nozzle, and a media supply in fluid communication with the volume of the nozzle. Metal from the media supply may be movable into the volume of the nozzle as the valve is actuated to eject, under pneumatic force of the pressurized gas in the nozzle, a liquid form of the metal from the discharge orifice along a controlled three-dimensional pattern associated with fabrication of a three-dimensional object.

Implementations may include one or more of the following features. Metal from the media supply may be movable into the volume while the valve is positioned to interrupt fluid communication between the discharge orifice of the nozzle and the source of the pressurized gas. The nozzle may further define a first port and a second port, the first port and the second port spaced apart from one another along the volume of the nozzle, the actuation of the valve controlling movement of the pressurized gas into the volume of the nozzle through the first port. The first port and the second port may be substantially axially aligned with one another along the volume of the nozzle. The media supply may be in fluid communication with the volume of the nozzle through the second port. The second port may be vented to the atmosphere. The second port may be vented to a vacuum. The system may further include a media drain in fluid communication with the volume of the nozzle, where the metal from the media supply is movable from the volume of the nozzle to the media drain. The discharge orifice and the first port may be positioned relative to one another such that metal moving from the media supply to the media drain moves between the discharge orifice and the first port. The system may further include a heater arranged to heat at least a portion of the nozzle adjacent to the discharge orifice. The heater may be one or more of a resistance heater and an induction heater. The metal supply may be movable into a portion of the volume adjacent to the discharge orifice. The system may further include an inert gas curtain disposed at least partially around the discharge orifice.

A method of additive manufacturing may include directing a metal into a volume defined by a nozzle, and moving a discharge orifice and a build plate relative to one another along a controlled three-dimensional pattern, where the discharge orifice is defined by the nozzle and in fluid communication with the volume. The method may also include, based at least in part on a position of the discharge orifice along the controlled three-dimensional pattern, selectively delivering pulses of pressurized gas into the volume to eject a liquid form of the metal from the discharge orifice to form a three-dimensional object on the build plate, where the metal is directed into the volume defined by the nozzle as the pulses of pressurized gas are selectively delivered into the volume.

Implementations may include one or more of the following features. Selectively delivering pulses of pressurized gas into the volume to eject the liquid form of the metal may include ejecting the liquid form of the metal from the discharge orifice in a direction having a vertical component opposite a direction of gravity. The method may further include heating the nozzle at least along a portion of the nozzle defining the discharge orifice. Directing the metal into the volume defined by the nozzle may include directing a solid form of the metal into the nozzle. The method may further include venting the pressurized gas from the volume of the nozzle through a port defined by the nozzle and in fluid communication with the atmosphere or a vacuum. Directing the metal into the volume may include moving the metal into the volume through the port. The pressurized gas may be inert with respect to the metal. The method may further include draining the liquid metal from the volume of the nozzle as the pulses of pressurized gas are selectively delivered into the volume. The liquid form of the metal may be ejected into one or more of an inert atmosphere and a vacuum housed within a build chamber during fabrication of the three-dimensional object. The method may further include adjusting the discharge orifice to control a meniscus of the liquid form of the metal at the discharge orifice.

Devices, systems, and methods are directed to adjusting a pneumatic circuit associated with pneumatic ejection of liquid metal from a nozzle as the nozzle moves along a controlled three-dimensional pattern to fabricate a three-dimensional object. The adjustment of the pneumatic circuit can facilitate adjusting a pressure profile within the nozzle as pressurized gas moves through the nozzle to eject, through pneumatic force, liquid metal from the nozzle. Through adjustment of the pneumatic circuit, characteristics of the liquid metal (e.g., size, shape, and flow rate) can be controlled to facilitate control over fabrication of the three-dimensional object.

An additive manufacturing system may include a nozzle defining a volume and a discharge orifice in fluid communication with one another, the nozzle including an exhaust passage in fluid communication with the volume. The system may also include a source of a pressurized gas in selective fluid communication with the volume of the nozzle, and a media supply in fluid communication with the volume of the nozzle such that metal from the media supply is movable into the volume, where the exhaust passage has an adjustable back pressure to control a pressure profile in the volume of the nozzle as the pressurized gas moves through the volume to eject a liquid form of the metal from the discharge orifice along a controlled three-dimensional pattern for fabrication of a three-dimensional object.

Implementations may include one or more of the following features. The exhaust passage may include a hydraulic inductance, the hydraulic inductance having a dissipating resistance to flow in response to force exerted, over a period of time, on the hydraulic inductance by venting pressurized gas in the exhaust passage. The hydraulic inductance may include a paddle wheel rotatable in response to force exerted on the paddle wheel by venting pressurized gas in the exhaust passage. The paddle wheel may be rotatable in response to force exerted on the paddle wheel by venting pressurized gas in the exhaust passage. A time-varying profile of the resistance of the hydraulic inductance may be adjustable. The exhaust passage may include a variable hydraulic resistance. The variable hydraulic resistance may include a variable length of the exhaust passage. The variable hydraulic resistance may include a flow restriction having a variable size. The system may further include a valve in fluid communication with the source of the pressurized gas and the volume, where the valve is actuatable to deliver pulses of the pressurized gas to the volume.

A method of additive manufacturing may include directing a metal into a volume defined by a nozzle, the volume in fluid communication with an exhaust passage defined by the nozzle. The method may also include moving a discharge orifice and a build plate relative to one another along a controlled three-dimensional pattern, the discharge orifice defined by the nozzle and in fluid communication with the volume. The method may also include delivering pulses of pressurized gas into the volume of the nozzle, and adjusting a back pressure of the exhaust passage through which the pressurized gas is vented from the volume of the nozzle, where, in response to the adjustment of the back pressure, the pressurized gas in the volume exerts a force on a liquid form of the metal in the nozzle to eject the liquid metal from the discharge orifice as the discharge orifice and the build plate are moved relative to one another along the controlled three-dimensional pattern to form a three-dimensional object on the build plate.

Implementations may include one or more of the following features. Adjusting the back pressure of the exhaust passage may include venting the pressurized gas through a hydraulic inductance having a dissipating resistance to flow in response to force exerted, over a period of time, on the hydraulic inductance by the venting pressurized gas in the exhaust passage. Dissipating resistance may dissipate to a substantially constant hydraulic resistance over the period of time. The period of time may be less than a period of the pulses of pressurized gas delivered into the volume of the nozzle. The hydraulic inductance may include a paddle wheel rotatable in response to force exerted on the paddle wheel by the venting pressurized gas in the exhaust passage. Adjusting the back pressure of the exhaust passage may include venting the pressurized gas through a variable hydraulic resistance and adjusting the variable hydraulic resistance based at least in part on a position of the discharge orifice with respect to the controlled three-dimensional pattern. The variable hydraulic resistance may include a flow restriction having a variable size and varying the variable hydraulic resistance may include changing the size of the flow restriction. The variable hydraulic resistance may include a variable length of the exhaust passage and varying the variable hydraulic resistance may include changing the length of the exhaust passage. Adjusting the back pressure of the exhaust passage may be based on a volume of the liquid form of the metal in the volume of the nozzle. The exhaust passage may be vented to at least one of atmospheric pressure and a vacuum. The metal may be directed into the volume through the exhaust passage. The method may also include tuning the pulses of pressurized gas in a multiple of a natural harmonic of the volume of the nozzle.

Devices, systems, and methods are directed to separating sediment from liquid metal ejected, through pneumatic force, from a nozzle moving along a controlled three-dimensional pattern to fabricate a three-dimensional object. The separation of the sediment from the liquid metal can reduce the likelihood that the nozzle will become clogged or otherwise degraded during fabrication of the three-dimensional object or over the course of fabrication of multiple objects. Accordingly, the separation of the sediment from the liquid metal can facilitate, for example, the use of pneumatic ejection of liquid metal for high volume production of parts.

An additive manufacturing system may include a nozzle defining a volume, a first port, a second port, and a discharge orifice in fluid communication with one another. The system may also include a source of a pressurized gas in selective fluid communication with the volume of the nozzle through the first port, a media supply in fluid communication with the volume of the nozzle through the second port, and one or more baffles disposed in the volume of the nozzle such that an axis defined by the discharge orifice and the second port intersects the one or more baffles, the one or more baffles oriented to direct sediment of a liquid form of a metal in the volume to a reservoir portion of the volume, the reservoir portion away from the discharge orifice.

Implementations may include one or more of the following features. The one or more baffles may define a non-linear path between the discharge orifice and the reservoir portion of the volume. The non-linear path between the discharge orifice and the reservoir portion of the volume may include an increase in height, along an axis perpendicular to the discharge orifice, along the non-linear path from the reservoir portion to the discharge orifice. The one or more baffles may span a dimension of the volume. The one or more baffles may include a plurality of baffles substantially parallel to one another. The one or more baffles may be angled with respect to an axis perpendicular to the discharge orifice. The media supply may be configured to move a solid form of metal into the volume through the second port. The second port may be vented to atmosphere such that pressurized gas exits the volume through the second port. A flow of pressurized gas through the first port may be substantially unimpeded by the one or more baffles. The system may also include a heater arranged to heat at least portions of the nozzle defining the discharge orifice and along which the one or more baffles are disposed. The heater may include one or more of a resistance heater, an induction heater, a convection heater, and a radiation heater.

A method of additive manufacturing may include directing a metal into a volume defined by a nozzle, and moving a discharge orifice and a build plate relative to one another along a controlled three-dimensional pattern, where the discharge orifice is defined by the nozzle and in fluid communication with the volume. The method may also include separating, in the volume, a liquid form of the metal from a sediment. Based at least in part on a position of the discharge orifice along the controlled three-dimensional pattern, the method may also include delivering pressurized gas into the volume to eject the liquid form of the metal from the discharge orifice to form a three-dimensional object on the build plate.

Implementations may include one or more of the following features. Separating the liquid form of the metal from the sediment may include moving the liquid form of the metal along a non-linear path from a sediment reservoir in the volume to the discharge orifice. Separating the liquid form of the metal from the sediment may further include increasing, in the volume, a height of the liquid form of the metal relative to the discharge orifice. The non-linear path may be at least partially defined by one or more baffles disposed in the volume. The liquid form of the metal may be separated from the sediment as the pressurized gas is delivered into the volume.

Devices, systems, and methods are directed to switching between pneumatically actuated ejection and electrically actuated ejection of liquid metal from a nozzle moving along a controlled three-dimensional pattern to fabricate a three-dimensional object. Electrically actuated ejection can be useful, for example, for delivering discrete droplets in areas of the object requiring a high degree of accuracy. Pneumatic ejection can be useful, for example, for delivering a stream of liquid metal from the nozzle to provide liquid metal rapidly to areas of the object that require less accuracy (e.g., an inner portion of the object). Accordingly, switching between pneumatically actuated ejection and electrically actuated ejection can facilitate accurate and rapid production of parts through additive manufacturing.

A method of additive manufacturing may include directing a metal into a volume defined by a nozzle, and moving a discharge orifice and a build plate relative to one another along a controlled three-dimensional pattern, the discharge orifice defined by the nozzle and in fluid communication with the volume. The method may also include, based at least in part on a position of the discharge orifice along the controlled three-dimensional pattern, selectively switching between pneumatically actuated ejection and electrically actuated ejection of a liquid form of the metal from the discharge orifice. The method may also include ejecting the liquid form of the metal from the discharge orifice according to the selected one of the pneumatically actuated ejection and the electrically actuated ejection to form at least a portion of a three-dimensional object.

Implementations may include one or more of the following features. Upon selection of the pneumatically actuated ejection, ejecting the liquid form of the metal from the discharge orifice may include ejecting a substantially constant stream of the liquid form of the metal from the discharge orifice. Upon selection of the electrically actuated ejection, ejecting the liquid form of the metal from the discharge orifice may include controlling a pulsed electrical current. Droplets of the liquid form of the metal may be ejected from the discharge orifice in response to the pulsed electrical current. Selectively switching between pneumatically actuated ejection and electrically actuated ejection may include selecting the electrically actuated ejection along a border of the controlled three-dimensional pattern and selecting the pneumatically actuated ejection along an excursion away from the border of the controlled three-dimensional pattern. Ejecting liquid metal from the discharge orifice according to pneumatically actuated ejection may include delivering pressurized air to the volume. The method may further include venting the pressurized air to one or more of the atmosphere and a vacuum as the liquid form of the metal is ejected through the discharge orifice. Ejecting liquid metal from the discharge orifice according to the electrically actuated ejection may include delivering an electric current into the liquid form of the metal. The electric current may result in a magnetohydrodynamic force exerted on the liquid form of the metal. The electric current may result in an electrohydrodynamic force exerted on the liquid form of the metal. Ejecting liquid metal from the discharge orifice according to the electrically actuated ejection may include delivering an electric current to an actuator in mechanical communication with the liquid form of the metal and movable in response to the electric current to exert a mechanical force on the liquid form of the metal to eject the liquid form of the metal from the discharge orifice. The actuator may include a piezoelectric element. The method may further include heating the metal in the volume at least along a portion of the volume defining the discharge orifice. Directing the metal into the volume may include moving the metal into the volume as the liquid form of the metal is discharged from the orifice. The method may further include draining the liquid form of the metal from the volume, through a media drain separate from the discharge orifice, as the liquid form of the metal is discharged from the orifice.

An additive manufacturing system may include a nozzle defining a volume and a discharge orifice in fluid communication with one another, a build plate spaced apart from the discharge orifice of the nozzle, a source of a pressurized gas, an electrical power source, a valve actuatable to control fluid communication between the source of the pressurized gas and the volume of the nozzle, and a robotic system mechanically coupled to the nozzle, where the robotic system is movable to move the discharge orifice and the build plate relative to one another in three-dimensions. The system may also include a controller in electrical communication with the valve, the electrical power source, and the robotic system, the controller configured to actuate the robotic system to move the discharge orifice and the build plate relative to one another along a controlled three-dimensional pattern, and the controller further configured to activate the valve and the power source, based at least in part on a position of the discharge orifice along the controlled three-dimensional pattern, to selectively switch between pneumatically actuated ejection and electrically actuated ejection of a liquid form of a metal from the discharge orifice to form a three-dimensional object on the build plate.

Implementations may include one or more of the following features. Selectively switching between pneumatically actuated ejection and electrically actuated ejection may include selecting the electrically actuated ejection along a border of the controlled three-dimensional pattern and selecting the pneumatically actuated ejection along an excursion away from the border of the controlled three-dimensional pattern. Upon selection of the pneumatically actuated ejection, the controller may actuate the valve to establish fluid communication between the source of the pressurized gas and the volume. Upon selection of the electrically actuated ejection, the controller may actuate the power source to deliver electric current to the volume. The controller may actuate the power source to deliver a pulsed electric current to the volume.

BRIEF DESCRIPTION OF THE DRAWINGS

The systems and methods described herein are set forth in the appended claims. However, for the purpose of explanation, several implementations are set forth in the following drawings:

FIG. 8 is a flowchart of an exemplary method of switching between pneumatically actuated ejection and electrically actuated ejection of liquid metal.

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
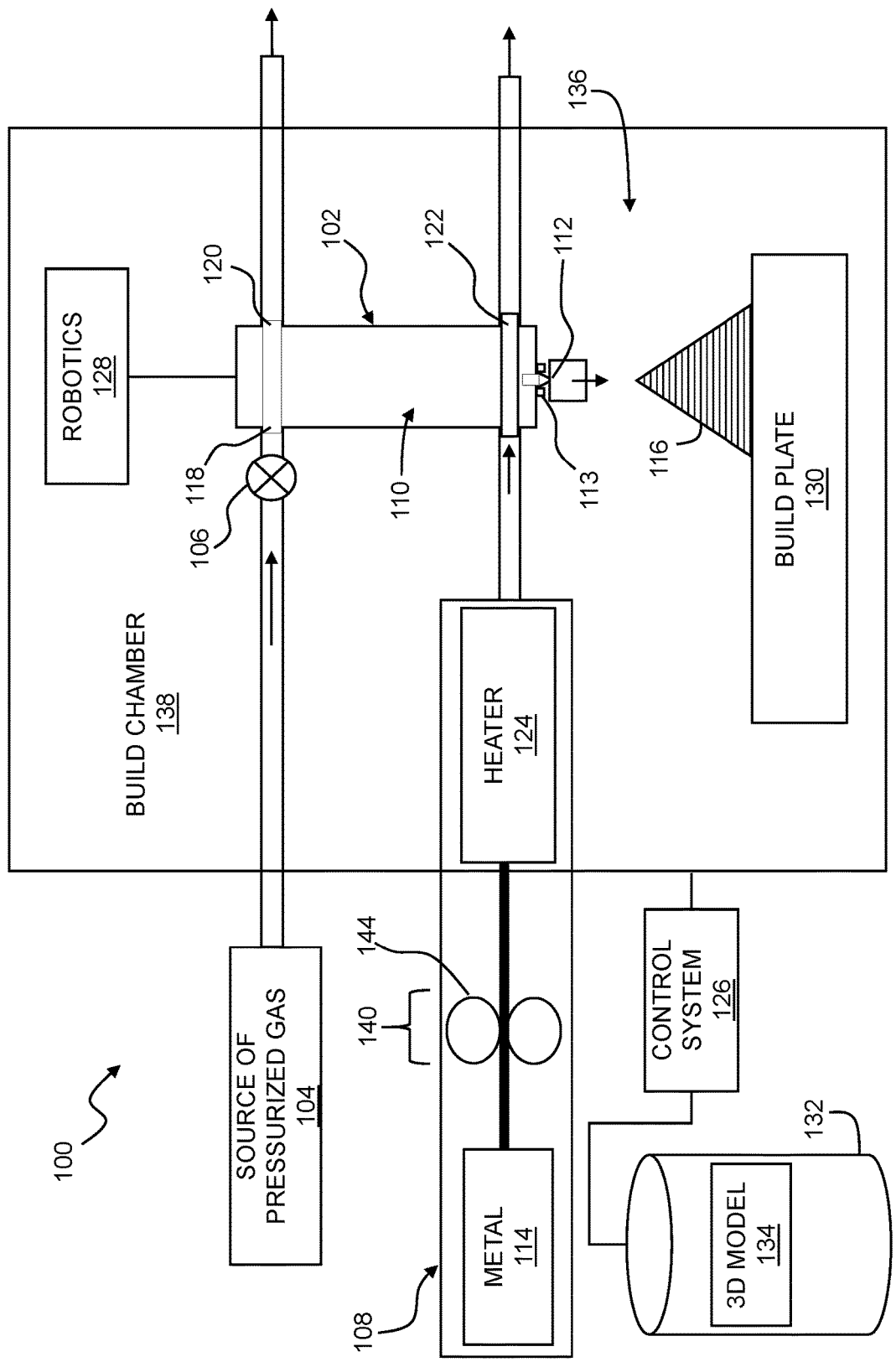
FIG. 1 is a block diagram of an additive manufacturing system for use with pneumatic jetting of metal to form a three-dimensional object.

Referring now to FIG. 1, a three-dimensional printer 100 can include a nozzle 102, a source 104 of pressurized gas, a valve 106, and a media supply 108. The nozzle 102 can define a volume 110 and a discharge orifice 112 in fluid communication with one another. The media supply 108 is in fluid communication with the volume 110 of the nozzle 102 and, as described in greater detail below, the media supply 108 moves metal 114 into the volume 110 such that a liquid form of the metal 114 is disposed in the volume 110 along the discharge orifice 112. The valve 106 can be actuated to control ejection of the liquid form of the metal from the discharge orifice 112. For example, the valve 106 can be moved to an open position to allow pressurized gas to fill the volume 110. Continuing with this example, as the pressurized gas fills the volume 110, the pressurized gas exerts a pneumatic force on the liquid form of the metal 114 along the discharge orifice 112. This pneumatic force can eject the liquid form of the metal 114 through the discharge orifice 112. Additionally, or alternatively, the valve 106 can be moved to a closed position to interrupt movement of pressurized gas into the volume 110 and, thus, interrupt ejection of the liquid form of the metal 114 through the discharge orifice 112. Thus, more generally, the valve 106 can be selectively actuated to control the ejection of the liquid form of the metal 114 during fabrication of a three-dimensional object 116.

In use, as described in greater detail below, movement of the metal 114 into the volume 110 can be separate from actuation of the valve 106, which can facilitate rapidly ejecting the liquid form of the metal 110 from the nozzle 102 to form the three-dimensional object 111. For example, by reducing or eliminating the need to pause a fabrication process to replenish liquid metal in a nozzle, the three-dimensional printer 100 can advantageously increase the speed of fabricating the three-dimensional object 116 through pneumatic jetting of a liquid form of the metal 114. More generally, it should be appreciated that the three-dimensional printer 100 can be substantially continuously operated to fabricate one or a plurality of the three-dimensional object 116, making the three-dimensional printer 100 well-suited, for example, to produce metallic objects at throughput rates suitable for mass production of parts.

The nozzle 102 can further include a first port 118 and a second port 120, each in fluid communication with the volume 110 of the nozzle 102. Pressurized gas from the source 104 of pressurized gas can enter the volume 110 of the nozzle 102 through first port 118 when the valve 106 is open. Additionally, or alternatively, the second port 120 can be in fluid communication with a lower pressure environment such that pressurized gas in the volume 110 of the nozzle 102 can exit the nozzle 102 through the second port 120. The lower pressure environment can be, for example, at atmospheric pressure. Additionally, or alternatively, the lower pressure environment can be a vacuum, which can facilitate producing a sharp reduction in pressure once fluid communication between the volume 110 and the source 104 of pressurized gas is interrupted. In certain implementations, a vacuum pressure can be applied briefly at the second port 120, which can be useful for providing further control over the pressure profile in the volume 110 during ejection of the liquid form of the metal 114 from the discharge orifice 112.

The first port 118 and the second port 120 can be spaced apart from one another along the volume 110 of the nozzle 102. For example, the first port 118 and the second port 120 can be substantially axially aligned with one another along the volume 110 of the nozzle 102. Such an alignment can be useful, for example, for reducing the likelihood of exciting a resonant frequency in the volume 110 as the pressurized air moves through the volume 110. In certain instances, the first port 118 and the second port 120 can define an axis substantially parallel to a plane containing the discharge orifice 112. In this orientation, the pressurized gas is indirectly directed to the discharge orifice 112, which can advantageously dampen the impact of pressure fluctuations in the incoming pressurized gas on the ejection of the liquid form of the metal 114.

In some implementations, the discharge orifice 112 can be oriented vertically such that the first port 118 and the second port 120 are below the discharge orifice 112. In such instances, the liquid form of the metal 114 ejected from the discharge orifice 112 can move in a direction opposite gravity to slow the velocity of the liquid form of the metal 114. Such slower velocity can be useful, for example, for achieving an appropriate shape of the metal 114 deposited on the three-dimensional object 116.

In some implementations, the discharge orifice 112 of the nozzle 102 may include an inert gas curtain around the discharge orifice 112, e.g., in the form of a ring 113 or other similar structure. This may be useful when operating in atmosphere or similar conditions. Thus, in certain implementations, an inert gas curtain may be disposed at least partially around the discharge orifice 112.

The discharge orifice 112 of the nozzle 102 may also be modified or otherwise treated to control the liquid form of the metal 114 ejected from the discharge orifice 112. For example, the geometry of the discharge orifice 112 may be adjustable. In certain aspects, the discharge orifice 112 may be replaceable or switchable with other discharge orifices 112 having different properties, e.g., for controlling the liquid form of the metal 114 ejected from the discharge orifice 112. For example, the discharge orifice 112 may be controlled to provide an initial condition where the liquid form of the metal 114 has a meniscus wetting the surface tangent to walls of the discharge orifice 112, e.g., by changing the geometry of the discharge orifice 112 or through a treatment of the discharge orifice 112. Similarly, the discharge orifice 112 may be controlled to provide an initial condition where the liquid form of the metal 114 has a meniscus that does not wet the surface tangent to walls of the discharge orifice 112, e.g., by changing the geometry of the discharge orifice 112 or through a treatment of the discharge orifice 112.

The source 104 of pressurized gas can be, for example, a pressurized tank. In certain implementations, the source 104 of the pressurized gas can have a pressure above about 550 kPa. Further, or instead, the pressurized gas can be inert with respect to the liquid form of the metal. For example, in certain instances, the pressurized gas can be nitrogen, argon, or air.

As the valve 106 is opened and the pressurized gas initially enters the volume 110 through the first port 118, pressure in the volume 110 initially increases. As described in greater detail below, the pressure in the volume 110 can increase until the pressure in the volume 110 is sufficient to overcome a flow resistance associated with the second port 120. Upon closing the valve 106, the movement of pressurized gas through the first port 118 can be interrupted, and pressure in the volume 110 can dissipate as the pressurized gas exits the volume 110 through the second port 120.

The metal 114 from the media supply 108 can be movable into the volume 110 while the valve 106 is positioned (e.g., closed) to interrupt fluid communication between the discharge orifice 112 and the source 104 of pressurized gas. Thus, for example, the flow rate of the metal from the media supply 108 into the volume 110 can be decoupled from the flow of pressurized gas through the volume 110. It should be appreciated that such decoupling can reduce the likelihood that the liquid form of the metal 114 in the volume 110 will become inadvertently depleted as the pressurized gas ejects the liquid form of the metal 114 through the discharge orifice 112. More generally, movement of the metal 114 from the media supply 108 into the volume 110 while the movement of pressurized gas into the volume 110 is interrupted can reduce the likelihood of interrupted operation of the nozzle 102 and, thus, can facilitate continuous or substantially continuous fabrication.

As used herein, the term "metal" shall be understood to include pure metals, metal alloys, and composite materials including one or more metallic components, unless otherwise specified or made clear by the context. Accordingly, by way of non-limiting example, the metal 114 can be any one or more of aluminum, an aluminum alloy, tin, and solder.

In certain implementations, the media supply 108 can be in fluid communication with the volume 110 through the second port 120. Thus, for example, the metal 114 can be moved (e.g., continuously) by the media supply 108 into the volume 110 through the same passage through which the pressurized gas is exhausted from the volume 110. It should be appreciated that such a configuration can, for example, reduce the number of ports required for the nozzle 102, which can facilitate reducing the size of the nozzle 102, as compared to a nozzle having a larger number of ports.

In some implementations, the nozzle 102 can further include a media drain 122 in fluid communication with the volume 110 of the nozzle 102. The metal 114 from the media supply 108 can move from the volume 110 to the media drain 122 to be drained from the nozzle 102 (e.g., for recycling to the media supply 108. As an example, the liquid form of the metal 114 moving through the volume 110 of the nozzle 102, from the media supply 108 to the media drain 122, can move between the discharge orifice 112 and the first port 118. Accordingly, continuing with this example, pressurized gas moving into the volume 110 through the first port 118 can exert a pneumatic force on the liquid form of the metal 114 moving past the discharge orifice 112 to eject the liquid form of the metal 114 through the discharge orifice 112. The movement of the liquid form of the metal 114 from the media supply 108 to the media drain can, for example, reduce the likelihood of sediment build-up in the volume 110. It should be appreciated that such a reduction in sediment build-up can reduce the likelihood of unintended blockage of the discharge orifice 112 and, thus, can facilitate continuous or substantially continuous ejection of the liquid form of the metal 114 over long periods of time.

In general, the three-dimensional printer 100 can include a control system 126 that can manage operation of the three-dimensional printer 100 to fabricate the three-dimensional object 116. For example, the control system 126 can be in electrical communication with the valve 106 and a robotic system 128 mechanically coupled to one or more of the nozzle 102 and a build plate 130. In use, the control system 126 can actuate the robotic system 128 to move the nozzle 102 along a controlled three-dimensional pattern and additionally, or alternatively, the control system 126 can actuate the valve 106 to control ejection of a liquid form of the metal 114 from the nozzle 102 as one or more of the nozzle 102 and the build plate 130 are moved along the controlled three-dimensional pattern. The controlled three-dimensional pattern can be based on a three-dimensional model 134 stored, for example, in a database 132, such as a local memory of a computer used as the control system 126, or a remote database accessible through a server or other remote resource, or in any other computer-readable medium accessible to the control system 126. In certain implementations, the control system 126 can retrieve the three-dimensional model 134 in response to user input, and generate machine-ready instructions for execution by the three-dimensional printer 100 to fabricate the three-dimensional object 116.

The robotic system 128 can be movable within a working volume 136 of a build chamber 138 to position the nozzle 102 and the build plate 130 relative to one another in the build chamber 138 along the controlled three-dimensional pattern to fabricate the three-dimensional object 116. A variety of robotics systems are known in the art and suitable for use as the robotic system 128 contemplated herein. For example, the robotic system 128 can include a Cartesian or x-y-z robotics system employing a number of linear controls to move independently in the x-axis, the y-axis, and the z-axis within the build chamber 138. Additionally, or alternatively, the robotic system 128 can include delta robots, which can, in certain implementations, provide significant advantages in terms of speed and stiffness, as well as offering the design convenience of fixed motors or drive elements. Other configurations such as double or triple delta robots can, additionally or alternatively, be used and can increase range of motion using multiple linkages. More generally, any robotics suitable for controlled positioning of the nozzle 102 and the build plate 130 relative to one another, especially within a vacuum or similar environment, may form part of the robotic system 114, including any mechanism or combination of mechanisms suitable for actuation, manipulation, locomotion and the like within the build chamber 138.

The build chamber 138 may include a relatively inert atmosphere. The build chamber 138 may also or instead include a vacuum. In this manner, the liquid form of the metal 114 may be ejected into one or more of an inert atmosphere and a vacuum during fabrication of a three-dimensional object 116.

The media supply 108 can include, for example, a drive chain 140 and a heater 142. In certain implementations, the metal 114 is initially in a solid form, such as, for example, a continuous form (e.g., wire) or a discrete form (e.g., a billet). For example, the metal 114 can be supplied in discrete units one-by-one as billets or the like into the heater 126. Additionally, or alternatively, the metal 114 can be supplied from a spool or cartridge containing the metal 114 in a wire form. For environmentally sensitive materials, the media supply 108, the build chamber 138, or both, can provide a vacuum environment for the metal 114. More generally, one or more of the media supply 108 and the build chamber 120 can maintain a suitably inert environment for handling of the metal 114, such as a vacuum, and oxygen-depleted environment, an inert gas environment, or some gas or combination of gasses that are not reactive with the metal 114 under the conditions maintained during three-dimensional fabrication.

In implementations in which the metal is initially in a solid form, the drive chain 140 can engage the metal and move the metal into the heater 142, where a liquid form of the metal can be formed. The heater 142 can be in fluid communication with the nozzle 102 such that the liquid form of the metal is movable into the nozzle as fluid communication between the pressurized gas and the nozzle 102 is, for example, separately controlled by actuation of the valve 106. While the media supply 108 is described as including a solid form of the metal 110 initially, it should be appreciated that, in some implementations, the metal 116 can initially be in a liquid form without departing from the scope of the present disclosure. In such implementations, the media supply 108 may, for example, feed a liquid form of the metal 116 into the nozzle 102 through the force of gravity, through the use of a pump, or a combination thereof.

The drive chain 140 can include, for example, any suitable gears, compression pistons, or the like, for continuous or indexed feeding of the metal 110 into the heater 142. In one aspect, the drive chain 140 can include a plurality of rollers 144 between which a solid form of the metal 114 can be pinched such that rotation of the plurality of rollers can move the solid form of the metal 114 into the heater 142.

The heater 142 can heat the solid form of the metal 114 beyond a melt temperature of the metal 114 to form a liquid form of the metal 114. Any number of heating techniques may be used. In one aspect, electrical techniques such as inductive or resistive heating may be usefully applied to liquefy the metal 114. This can include, for example, inductively or resistively heating a chamber around the metal 114. Additionally, or alternatively, the heater 142 can include one or more of induction heating and radiative heating to liquefy the metal 114.

While the heater 142 is shown as being outside of the nozzle 102, it should be appreciated, that the heater 142 can be, additionally or alternatively, integrated into the nozzle 102 such that, for example, a solid form of the metal 110 is moved from the metal supply into the nozzle 102 and the solid form of the metal 110 is melted as it passes into the nozzle 102. In such implementations, the heater 142 can, for example, direct heat in the vicinity of the discharge orifice 112. In general, direction of heat in the vicinity of the discharge orifice 112 can reduce the likelihood of solidification of the liquid form of the metal 114 in the discharge orifice 112 and, thus, can reduce the likelihood of the nozzle 102 seizing or otherwise becoming inoperable during a fabrication process. For example, the heater 142 can reduce the likelihood of solidification of the liquid form of the metal 114 in or near the discharge orifice 112 during a quiescent state in which the liquid form of the metal 114 is not being ejected from the discharge orifice 112 (e.g., between part fabrications).

The heater 142 can also or instead include any other heating systems suitable for applying heat to the metal 110 to a suitable temperature for producing or maintaining a liquid form of the metal 110. Thus, the heater 106 described herein should be understood to include generally any system that places a solid form of the metal 110 in condition for use in fabrication as contemplated herein and further includes any system that maintains a liquid form of the metal 114 in condition for use in fabrication as contemplated herein. In certain implementations, the system 100 can further include a heater 124 disposed along a portion of the nozzle 102 adjacent (e.g., directly adjacent) to the discharge orifice 112.

Figure 2:
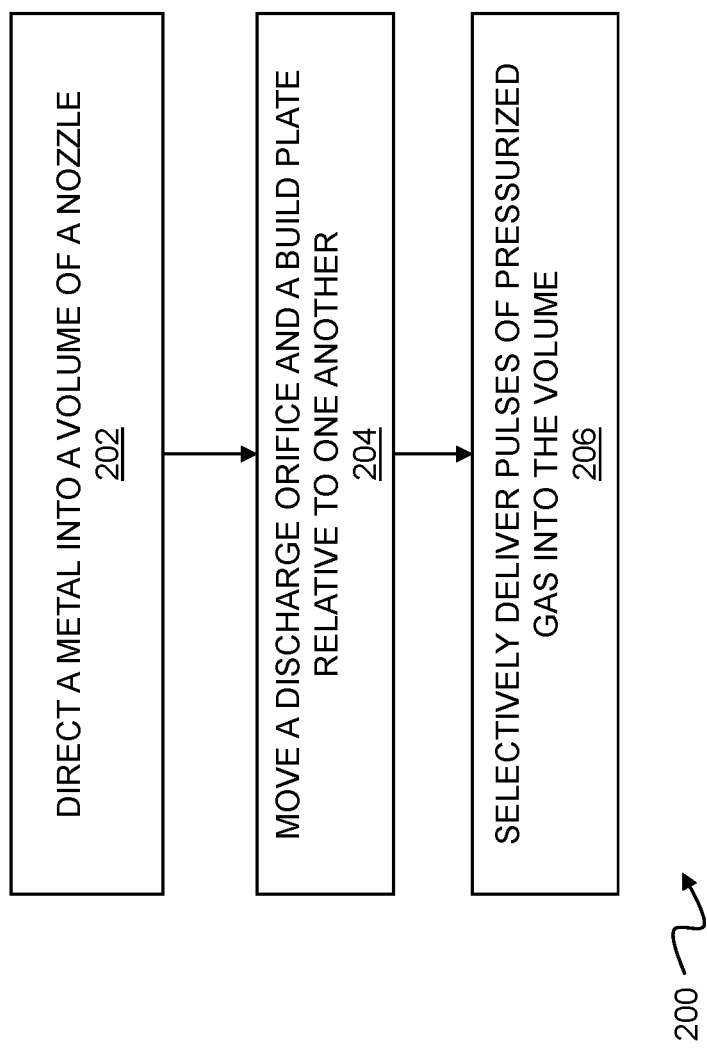
FIG. 2 shows a flowchart of an exemplary method of additive manufacturing of metal using pneumatic jetting.

FIG. 2 shows a flowchart of an exemplary method 200 of additive manufacturing of metal using pneumatic jetting. The method 200 can be carried out using any one or more of the devices and systems described herein, unless otherwise specified or made clear from the context. Thus, for example, it should be understood that the method 200 can be carried out using the three-dimensional printer 100 described above with respect to FIG. 1.

As shown in step 202, the method 200 may include directing a metal into a volume defined by the nozzle. For example, a solid form of the metal can be directed into the volume defined by the nozzle. In certain implementations, the solid form of the metal can be liquefied within the volume defined by the nozzle. Additionally, or alternatively, the metal can be liquefied outside of the volume defined by the nozzle and delivered into the volume in a liquid form.

As shown in step 204, the method 200 can include moving a discharge orifice and a build plate relative to one another along a controlled three-dimensional pattern. Such relative movement can be achieved in one or more of various different combinations of movement of the discharge orifice and the build plate. For example, the discharge orifice can be moved along the controlled three-dimensional pattern while the build plate remains stationary. Additionally, or alternatively, the build plate can be moved along the controlled three-dimensional pattern while the discharge orifice remains stationary. Further or instead, the discharge orifice and the build plate can each be moved along the controlled three-dimensional pattern.

The discharge orifice can be defined by the nozzle and in fluid communication with the volume such that the liquid form of the metal can move from the volume through the discharge orifice as the discharge orifice and the build plate are moved relative to one another along the controlled three-dimensional pattern. In certain implementations, a robotic system can move the discharge orifice and the build plate relative to one another along the controlled three-dimensional pattern. The robotic system can be, for example, any one or more of the various different robotic systems described herein or otherwise known in the art. Additionally, or alternatively, actuation of the robotic system to move the discharge orifice and the build plate relative to one another can be controlled by a control system, such as any one or more of the various control systems described herein. For example, the control system can control actuation of the robotic system based at least in part upon a three-dimensional model received by the control system.

As shown in step 206, the method 200 can include selectively delivering pulses of pressurized gas into the volume to eject a liquid form of the metal from the discharge orifice to form a three-dimensional object. The selective delivery of the pulses can be, for example, based at least in part on a position of the discharge orifice along the controlled three-dimensional pattern. In certain implementations, the metal can be directed into the volume according to step 202 while the pulses of pressurized gas are selectively delivered into the volume. In some implementations, the metal in the liquid form can be drained from the volume of the nozzle as the pulses of pressurized gas are selectively delivered into the volume. Thus, more generally, the metal can be moved in and out of the volume of the nozzle independently of delivery of the pressurized gas into the volume of the nozzle.

Further, or instead, selectively delivering pulses of pressurized gas into the volume to eject the liquid form of the metal can include ejecting the liquid form of the metal from the discharge orifice in a direction having a vertical component substantially opposite a direction of gravity. It should be understood that the ejection of the liquid form of the metal in this direction can advantageously slow down the ejected liquid form of the metal to achieve desired contact between the ejected liquid form of the metal and a three-dimensional object being fabricated.

In certain implementations, selectively delivering pulses of pressurized gas into the volume to eject the liquid form of the metal can include controlling the pulse frequency. The pulse frequency may be controlled or tuned to increase a stability of a meniscus of the liquid metal prior to droplet ejection, e.g., between each ejection. In certain aspects, the pulse frequency may be tuned in multiples of the natural harmonics of the volume of the nozzle.

Figure 3:
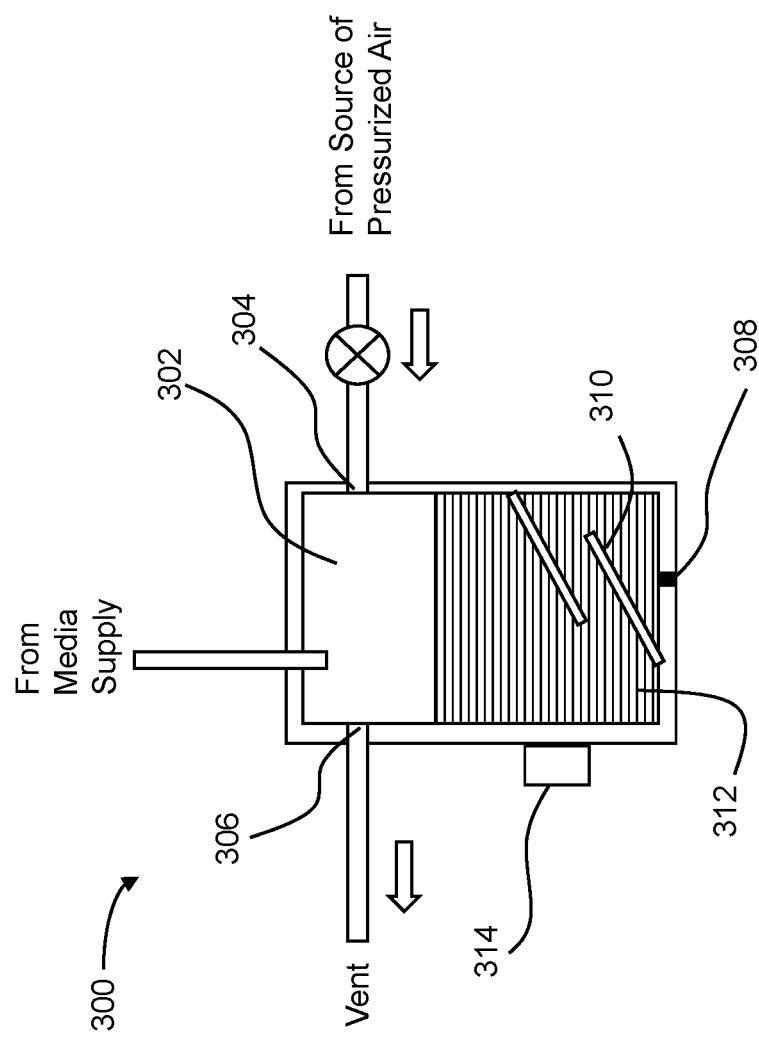
FIG. 3 is a schematic representation of a nozzle including baffles.

While certain implementations have been described, other implementations are additionally, or alternatively, possible. For example, while nozzles have been described as having an unimpeded path between metal entering the nozzle and a discharge orifice through which metal is ejected from the nozzle, other configurations are additionally or alternatively possible. As an example, referring now to FIG. 3, a nozzle 300 can define a volume 302, a first port 304, a second port 306, and a discharge orifice 308 in fluid communication with one another. In general, unless otherwise specified or made clear from the context, the nozzle 300 can be used in addition to or in place of the nozzle 102 of the three-dimensional printer 100 described above with respect to FIG. 1. Thus, for example, the nozzle 300 can be in selective fluid communication with pressurized gas from a source of pressurized gas, such as the source 104 of the pressurized gas described above with respect to FIG. 1, with the fluid communication with the volume 302 being through the first port 304. Similarly, the nozzle 300 can receive metal from a media supply, such as the media supply 108 described above with respect to FIG. 1, in fluid communication with the volume 302 of the nozzle through the second port 306. Thus, for example, it should be understood that the nozzle 300 can receive a solid form of metal through the second port 306 and, additionally or alternatively, the second port 306 can be vented to one or both of an atmospheric pressure and a vacuum pressure such that pressurized gas can exit the volume through the second port 306.

The nozzle 300 can include one or more baffles 310 disposed in the volume 302 (e.g., a plurality of baffles 310 arranged substantially parallel to one another). In general, the baffles 310 can be oriented to direct sediment toward a reservoir portion 312 of the volume 302. The reservoir portion 312 can be away from the discharge orifice 308 of the nozzle 300 such that sediment directed toward the reservoir portion 312 remains away from the discharge orifice 308 as the liquid metal is ejected from the discharge orifice 308 during use of the nozzle 300.

In certain implementations, an axis defined by the discharge orifice 308 and the second port 306 intersects the one or more baffles 310. In such implementations, the flow of metal moving into the volume 302 through the second port 306 will be disturbed by the one or more baffles 310 as the metal moves toward the discharge orifice 308. It should be appreciated that such disturbance of the flow of the metal can be useful for directing sediment toward the reservoir portion 312 of the volume 302. Further, or instead, the one or more baffles 310 can be angled, for example, with respect to an axis perpendicular to the discharge orifice 308 to direct sediment, for example, toward the reservoir portion 312 of the volume 302.

In some implementations, the one or more baffles 310 can span a dimension of the volume 302 of the nozzle 300. For example, the one or more baffles 310 can span a depth of the volume 302 and span less than the entirety of the width of the volume 302. In general, spanning a dimension of the volume 302 with the one or more baffles 310 can increase the likelihood that the flow of the liquid metal from the second port 306 toward the discharge orifice 308 will be directed to the reservoir portion 312 before reaching the discharge orifice 308.

In addition, or in the alternative, the one or more baffles 310 can define a non-linear path between the discharge orifice 308 and the reservoir portion 312. As an example, the non-linear path can include a section increasing in height, along an axis perpendicular to the discharge orifice 308 such that liquid metal moving from the reservoir portion 312 toward the discharge orifice 308 follows the increase in height. Such an increase in height can be useful for separating sediment from the liquid metal before the liquid metal reaches the discharge orifice. More generally, a non-linear path can be useful, for example, for reducing the likelihood that sediment will migrate from the reservoir portion 312 to the discharge orifice 308 during sustained use of the nozzle 300 to eject a liquid form of a metal.

In general, pressurized gas can be moved through the volume 302, from the first port 304 to the second port 306, in any one or more of various different directions. It should be appreciated, however, that certain orientations of the first port 304 and the second port 306 can be advantageous for efficient and accurate operation of the nozzle 300 to eject liquid metal. Thus, in certain implementations, the flow of pressurized gas through the first port 304 can be substantially unimpeded by the one or more baffles 310 such that the one or more baffles 310 do not slow down the movement of pressurized gas into the volume 300 during use.

The nozzle 300 can, in some implementations, include a heater 314. The heater 314 can, for example, direct heat along at least portions of the nozzle 300 defining the discharge orifice 308 and along which the one or more baffles 310 are disposed. The application of heat along such portions of the nozzle 300 can reduce the likelihood that the liquid metal will solidify as the liquid metal is moving along the one or more baffles 310 and toward the discharge orifice 308. The heater 314 can include, for example, one or more of a resistance heater, an induction heater, a convection heater, and a radiation heater.

Figure 4:
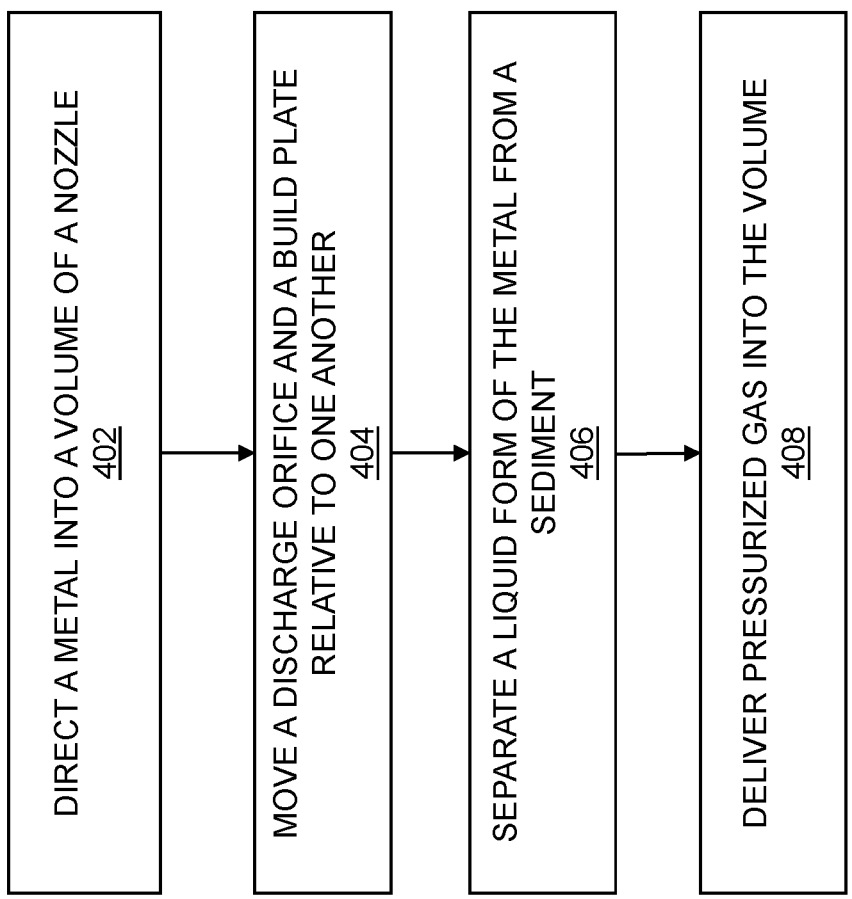
FIG. 4 is a flowchart of an exemplary method of separating liquid metal from sediment in a pneumatic jetting process for additive manufacturing of metal.

FIG. 4 is a flowchart of an exemplary method 400 of separating liquid metal from sediment in a pneumatic jetting process for additive manufacturing of metal. The method 400 can be carried out using any one or more of the three-dimensional printers described herein, unless otherwise specified or made clear from the context. Thus, for example, the method 400 can be carried out using a three-dimensional printer, such as the three-dimensional printer 100 described above with respect to FIG. 1, including the nozzle 300 described above with respect to FIG. 3.

As shown in step 402, the method 400 can include directing a metal into a volume defined by a nozzle. In general, the metal can be directed into the volume according to any one or more of the methods described herein. Thus, for example, a solid form of the metal can be directed into the volume defined by the nozzle such that the solid form of the metal can be liquefied within the volume defined by the nozzle. Additionally, or alternatively, the metal can be liquefied outside of the volume defined by the nozzle and delivered into the volume in a liquid form.

As shown in step 404, the method 400 can include moving a discharge orifice and a build plate relative to one another along a controlled three-dimensional pattern. The discharge orifice can be defined by the nozzle and in fluid communication with the volume such that metal in the volume can move through the discharge orifice along the controlled three-dimensional pattern. It should be appreciated that the relative movement of the discharge orifice and the build plate can be achieved by moving one or both of the discharge orifice and the build plate relative to one another.

As shown in step 406, the method 400 can include separating a liquid form of the metal from a sediment. The separation can take place, for example, in the volume defined by the nozzle, and the volume can define a sediment reservoir. The separation can include, for example, moving the liquid form of the metal along a non-linear path from the sediment reservoir to the discharge orifice (e.g., a non-linear path at least partially defined by baffles disposed in the volume defined by the nozzle). The movement of the liquid form of the metal along the non-linear path can facilitate, for example, separation of the liquid form of the metal from the sediment. Additionally, or alternatively, separating the liquid form of the metal from the sediment can include increasing, in the volume of the nozzle, a height of the liquid form of the metal relative to the discharge orifice. As the height of the liquid form of the metal increases, the sediment will settle and, thus, separate from the liquid form of the metal.

As shown in step 408, the method 400 can include delivering pressurized gas into the volume to eject the liquid form of the metal from the discharge orifice to form a three-dimensional object. The delivery of the pressurized gas can be, for example, based at least in part on a position of the discharge orifice along the controlled three-dimensional pattern such that the ejected metal can be accurately delivered to the three-dimensional object being fabricated. Additionally, or alternatively, the separation of the liquid form of the metal from the sediment in step 406 can occur while the pressurized gas is delivered into the volume such that the separation of the liquid metal from the sediment does not significantly impact the speed of fabrication of the three-dimensional object.

Figure 5:
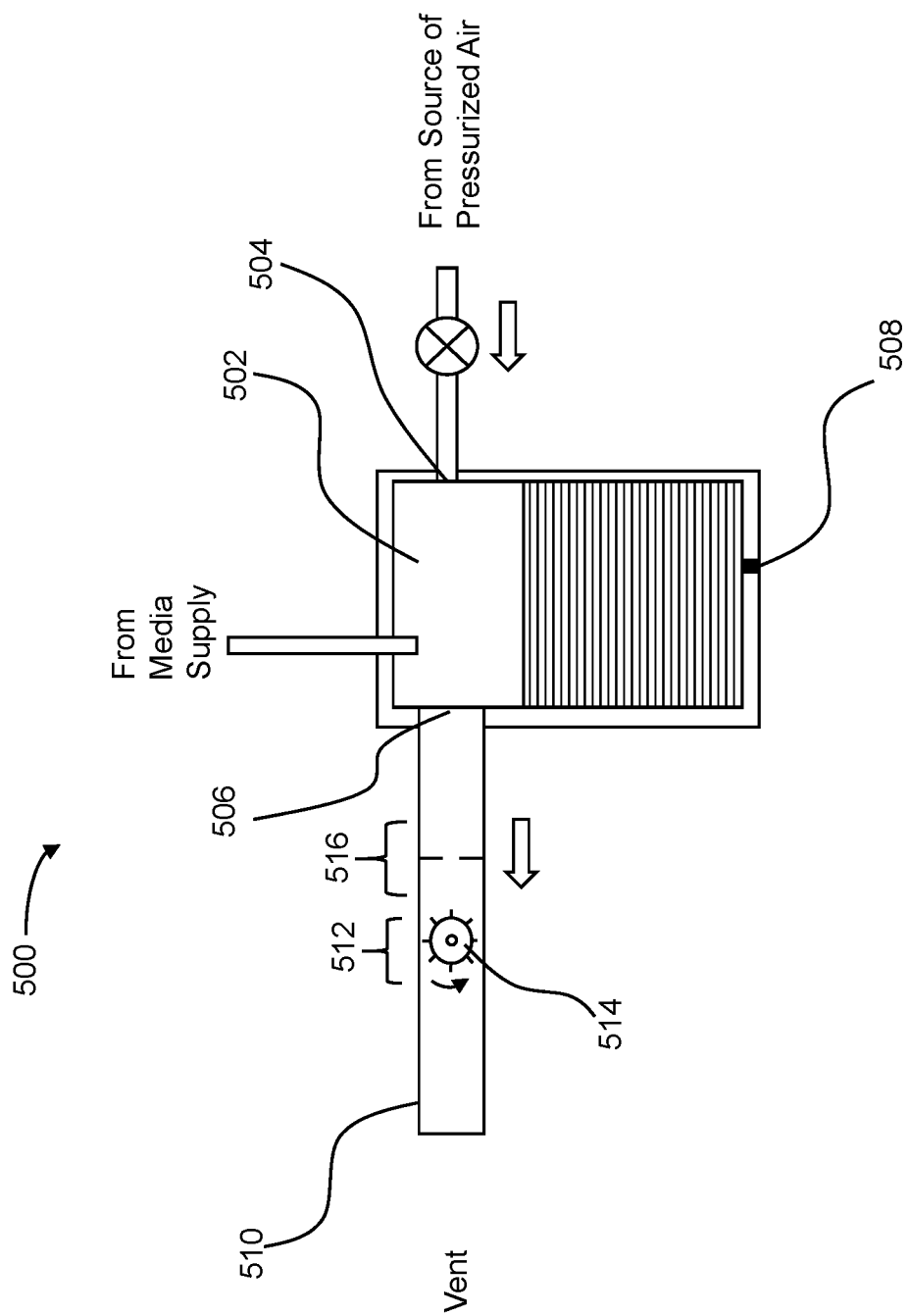
FIG. 5 is a schematic representation of a nozzle including an adjustable exhaust passage.

As another example, while nozzles have been described as having a fixed pressure profile, other implementations are additionally or alternatively possible. As an example, referring now to FIG. 5, a nozzle 500 can define a volume 502, a first port 504, a second port 506, and a discharge orifice 508 in fluid communication with one another. Further, or instead, the nozzle 500 can include an exhaust passage 510, as described in greater detail below. In general, unless otherwise specified or made clear from the context, the nozzle 500 can be used in addition to or in place of the nozzle 102 of the three-dimensional printer 100 described above with respect to FIG. 1 or the nozzle 300 described above with respect to FIG. 3. Thus, for example, the nozzle 500 can be in selective fluid communication with pressurized gas from a source of pressurized gas, such as the source 104 of the pressurized gas described above with respect to FIG. 1, with the fluid communication with the volume 502 being through the first port 504. Similarly, the nozzle 500 can receive metal from a media supply, such as the medial supply 108 described above with respect to FIG. 1, which can be in fluid communication with the volume 502 through the second port 306. Thus, for example, it should be understood that the nozzle 300 can receive a solid form of metal through the second port 506 and, additionally or alternatively, the second port 506 can be vented through the exhaust passage 510.

The exhaust passage 510 can have an adjustable back pressure. In general, such adjustable back pressure can be useful for controlling a pressure profile in the volume 502 defined by the nozzle 500 as pressurized gas moves through the volume 502 to eject a liquid form of the metal from the discharge orifice 508 (e.g., along a controlled three-dimensional pattern for fabrication of a three-dimensional object).

As used herein, the pressure profile in the volume 502 includes pressure in the volume 502 as a function of time. It should be appreciated that characteristics of the pressure profile (e.g., rate of pressure rise, peak pressure, rate of pressure decay, and duration) can impact the shape of droplets ejected from the discharge orifice 508 in response to pulsations of the pressurized gas in the nozzle 500.

In certain implementations, the exhaust passage 510 can include a hydraulic inductance 512. As pressurized gas moves through the hydraulic inductance 512, the hydraulic inductance 512 can have a dissipating resistance, over time, in response to force exerted on the hydraulic inductance 512 as the pressurized gas exits the volume 502 through the exhaust passage 510. For example, as pressurized gas is initially introduced to the hydraulic inductance 512, the flow resistance of the hydraulic inductance 512 can be high such that pressure builds in the volume 502. Continuing with this example, as the pressurized gas continues to exert force on the hydraulic inductance 512, the flow resistance of the hydraulic inductance 512 can decrease such that the built-up pressure in the volume 502 can dissipate as the pressurized gas moves through the hydraulic inductance 512 at a higher rate.

As an example, the hydraulic inductance 512 can include a paddle wheel 514. In use, the paddle wheel 514 can rotate in response to force exerted on the paddle wheel 514 by the venting pressurized gas in the exhaust passage 510. The paddle wheel 514 can have an inertia that must be overcome before the paddle wheel 514 can rotate freely. It should be appreciated that the force of the pressurized gas on the paddle wheel 514 prior to overcoming the inertia can correspond to a rise in pressure in the volume 502. As the pressurized gas continues to be exerted on the paddle wheel 514 and the inertia is overcome, the paddle wheel 514 can rotate freely such that the paddle wheel 514 exerts little to know resistance on the flow of the pressurized gas.

In certain implementations, the time-varying profile of the resistance of the hydraulic inductance 512 can be adjustable to facilitate achieving a desired pressure profile (e.g., in real-time) in the volume 502. Such adjustability can be useful, for example, for controlling the size and shape of droplets ejected from the discharge orifice 508. For example, in implementations in which the hydraulic inductance 512 includes the paddle wheel 514, a rotational resistance of the paddle wheel 514 can be adjusted to change the time-varying profile of the resistance of the hydraulic inductance 512.

In certain implementations, the exhaust passage 510 can include a variable hydraulic resistance 516. As an example, the variable hydraulic resistance 516 can include a variable length of the exhaust passage 510, with longer lengths generally corresponding to increased hydraulic resistance. Additionally, or alternatively, the variable hydraulic resistance 516 can include a flow restriction (e.g., an orifice) having a variable size. In certain implementations, the variable hydraulic resistance 516 can be adjusted to achieve a target pressure profile (e.g., in real-time) in the volume 502.

Figure 6:
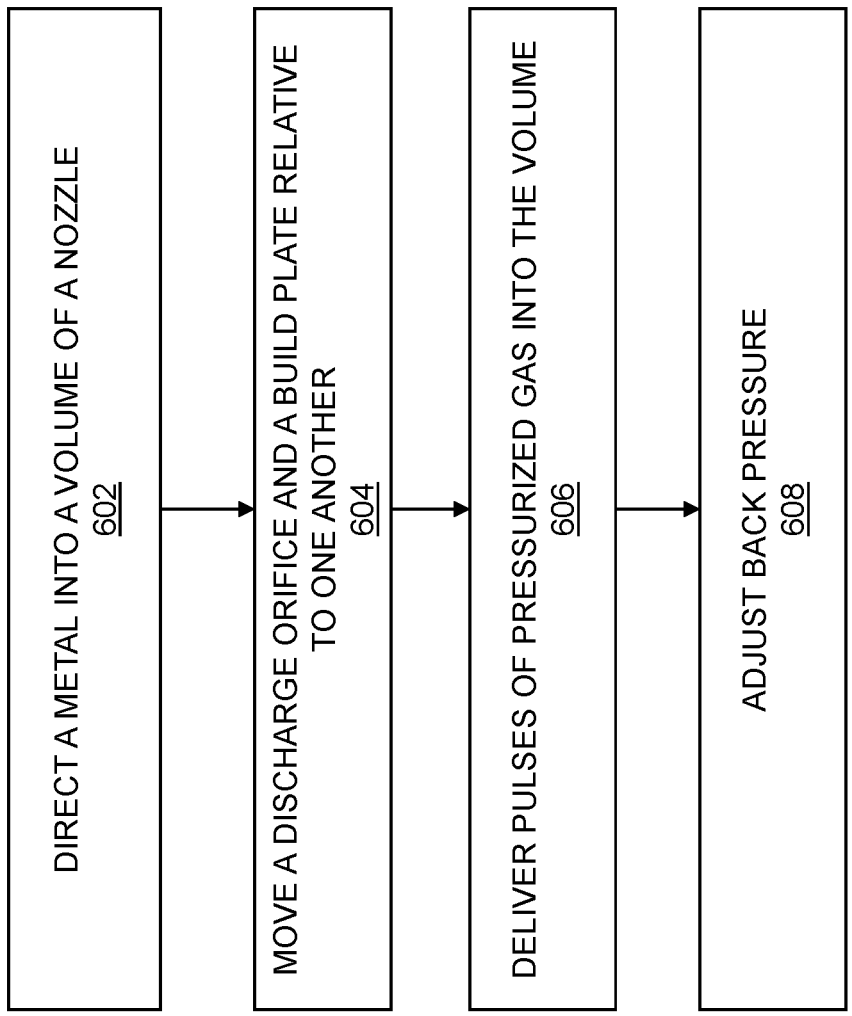
FIG. 6 is a flowchart of an exemplary method of adjusting back pressure in a pneumatic jetting process for additive manufacturing of metal.

FIG. 6 is a flowchart of an exemplary method 600 of adjusting back pressure in a pneumatic jetting process for additive manufacturing of metal. The method 600 can be carried out using any one or more of the three-dimensional printers described herein, unless otherwise specified or made clear from the context. Thus, for example, the method 600 can be carried out using a three-dimensional printer, such as the three-dimensional printer 100 described above with respect to FIG. 1, including the nozzle 500 described above with respect to FIG. 5.

As shown in step 602, the method 600 can include directing a metal into a volume defined by the nozzle. In general, the metal can be directed into the volume according to any one or more of the methods described herein. Thus, for example, a solid form of the metal can be directed into the volume defined by the nozzle such that the solid form of the metal can be liquefied within the volume defined by the nozzle. Additionally, or alternatively, the metal can be liquefied outside of the volume defined by the nozzle and delivered into the volume in a liquid form.

As shown in step 604, the method 600 can include moving a discharge orifice and a build plate relative to one another along a controlled three-dimensional pattern. The discharge orifice can be defined by the nozzle and in fluid communication with the volume such that a liquid form of the metal can be ejected through the discharge orifice as the discharge orifice and the build plate are moved relative to one another along the controlled three-dimensional pattern.

As shown in step 606, the method 600 can include delivering pulses of pressurized gas into the volume of the nozzle. For example, delivering pulses of pressurized gas can include repeatedly actuating a valve disposed between the volume and a source of the pressurized gas according to any one or more of the various different methods described herein. It should be appreciated that, in general, the characteristics of the pulsations (e.g., amplitude and rate) can be a function of the shape and size of liquid metal droplets desired for a given position along the controlled three-dimensional pattern.

As shown in step 608, the method 600 can include adjusting a back pressure of an exhaust passage in fluid communication with the volume of the nozzle and through which the pressurized gas is vented from the volume of the nozzle. In general, in response to the adjustment of the back pressure, the pressurized gas in the volume can exert a force (e.g., a changing force) on the liquid form of the metal in the volume to eject the liquid metal from the discharge orifice. As the discharge orifice and the build plate are moved relative to one another along the controlled three-dimensional pattern, the ejected liquid metal can accumulate to form a three-dimensional object on the build plate.

Adjusting the back pressure in step 608 can include any one or more of the adjustments described above with respect to the nozzle 500 of FIG. 5. As an example, adjusting the back pressure in step 608 can include venting the pressurized gas through a hydraulic inductance having a dissipating resistance to flow in response to force exerted by the venting pressurized gas. In general, the hydraulic inductance can be any of the various different hydraulic inductances described herein and, therefore, can include a paddle wheel (e.g., the paddle wheel 514 of FIG. 1) or other similar devices. The dissipating resistance can have a profile suited to achieving a desired pressure profile in the volume as the pressurized gas is pulsed in the volume. In certain implementations, the dissipating resistance can dissipate to a substantially constant hydraulic resistance in the exhaust passage. Additionally, or alternatively, the period of time over which the resistance dissipates can be less than a period of the pulses of the pressurized gas in the volume. Such a rapid dissipation can be useful, for example, for controlling the size and shape of the ejected liquid metal.

As an additional, or alternative, example, adjusting the back pressure in step 608 can include venting the pressurized gas through a variable hydraulic resistance and adjusting the variable hydraulic resistance. For example, the hydraulic resistance can be varied based at least in part on a position of the discharge orifice with respect to the controlled three-dimensional pattern. It should be appreciated that varying hydraulic resistance can include any one or more of the methods of varying hydraulic resistance described herein and, therefore, can include one or more of varying size of a flow restriction and varying a length of an exhaust passage.

In certain implementations, adjusting the back pressure of the exhaust passage in step 608 can be based on a volume of the liquid form of the metal in the volume of the nozzle. As an example, the back pressure can be adjusted to a higher pressure as the volume of the liquid form of the metal in the volume of the nozzle increases. The higher back pressure can correspond to a higher pressure in the volume. In turn, the increase in back pressure can increase the amount of the liquid form of the metal ejected from the discharge orifice and, thus, reduce the volume of the liquid form of the metal in the volume of the nozzle. It should be appreciated that a reduction in the back pressure can decrease the amount of the liquid form of the metal ejected from the discharge orifice and, thus, increase the volume of the liquid form of the metal in the volume of the nozzle.

Figure 7:
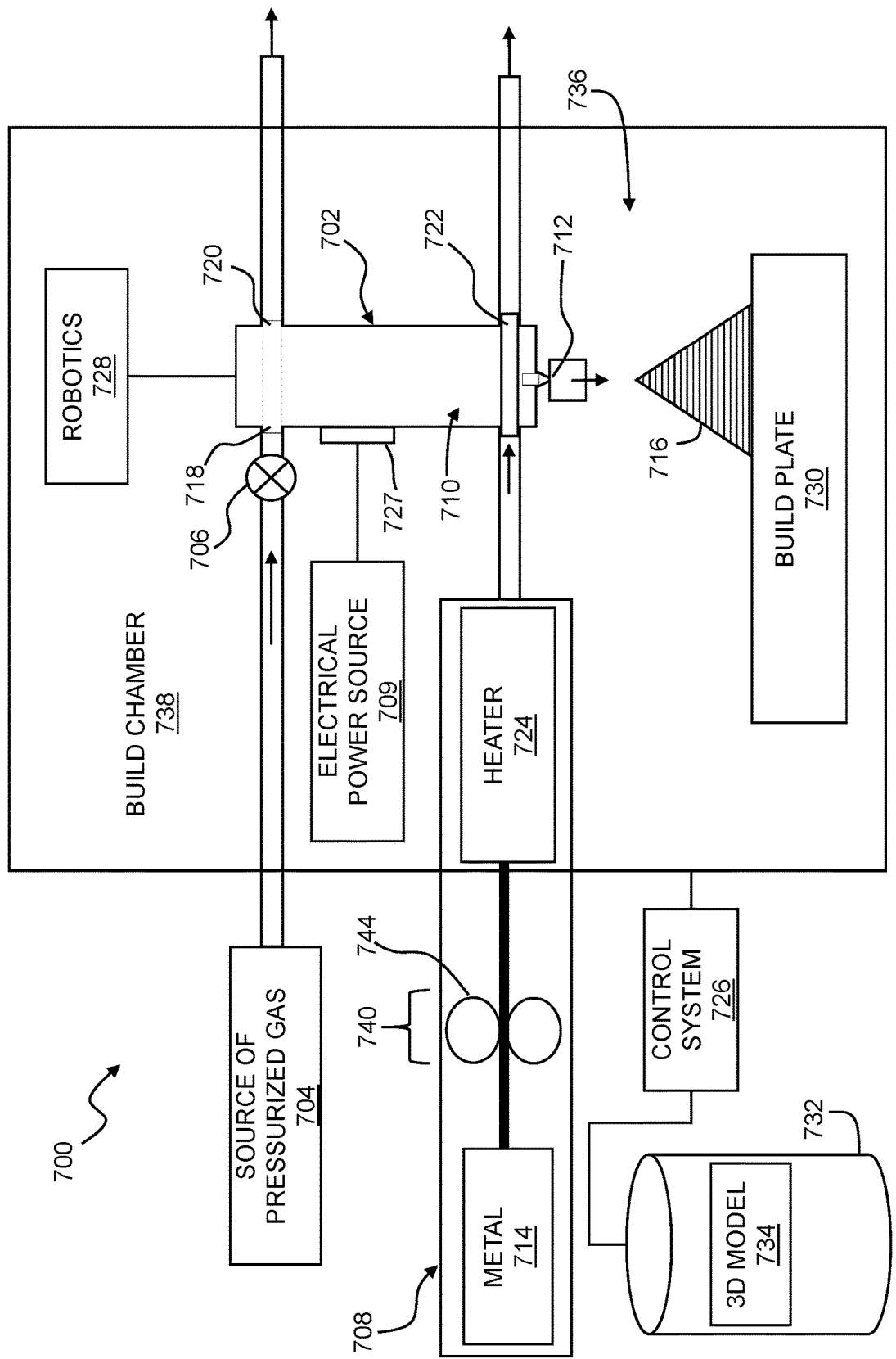
FIG. 7 is a schematic representation of an additive manufacturing system for use with pneumatically actuated jetting and electrically actuated jetting of metal to form a three-dimensional object.

As another example, while additive manufacturing systems have been described as including pneumatic jetting, other configurations are additionally or alternatively possible. For example, referring now to FIG. 7, a three-dimensional printer 700 switchable between pneumatically actuated ejection and electrically actuated ejection. Unless otherwise specified or made clear by the context, elements having "700" series element numbers are the same as elements having analogous "100" series element numbers in FIG. 1. Thus, for example, the robotic system 708 in FIG. 7 should be understood to be analogous to the robotic system 108 in FIG. 1, unless otherwise specified or made clear from the context. Accordingly, for the sake of efficient explanation, elements having "700" series element numbers are not described separately from the analogous elements having "100" series element numbers, except to point out features related to switching between pneumatically actuated ejection and electrically actuated ejection. As used herein, "pneumatically actuated ejection" should be understood to include ejection of liquid metal through the application of a pneumatic force exerted, directly or indirectly, on the liquid metal through the force of a pressurized gas. Also, as used herein, "electrically actuated ejection" should be understood to include ejection of liquid metal through the application of a magnetohydrodynamic force, an electrohydrodynamic force, or an electro-mechanically actuated force on the liquid metal.

The three-dimensional printer 700 can include a control system 726 in electrical communication with a valve 706 and an electrical power source 709. The valve 706 can be actuatable to control fluid communication between a source 704 of pressurized gas and a volume 710 defined by a nozzle 702, as described above with respect to the valve 106 in FIG. 1. electrical communication with the nozzle 702 and the control system 726. In use, the control system 726 can control the valve 706 and the electrical power source 709 to selectively switch between pneumatically actuated ejection and electrically actuated ejection of a liquid form of a metal 714 from a discharge orifice 712 defined by the nozzle 702.

In certain implementations, the control system 726 can place the nozzle 702 in a pneumatically actuated ejection mode by actuating the valve 706 to establish fluid communication between the source 704 of pressurized gas and the volume 710 defined by the nozzle 702 to eject a liquid form of the metal 714 according to any one or more of the methods described herein. In the pneumatically actuated ejection mode, the control system 726 can, optionally, interrupt electrical communication between the electrical power source 709 and the nozzle 702.

Further, or instead, the control system 726 can place the nozzle 702 in an electrically actuated ejection mode by actuating the valve 706 to interrupt fluid communication between the source 704 of pressurized gas and the volume 710 and actuating the electrical power source 709 to deliver electric current to the nozzle 702. It should be appreciated that the electric current can be, for example, a pulsed electric current to eject discrete liquid metal droplets (e.g., drop-on-demand) from the discharge orifice 712. In certain implementations, the electric current can be directed into the liquid form of the metal in the nozzle 702, where the electric current can intersect a magnetic field extending through the liquid form of the metal to create a magnetohydrodynamic force to eject the liquid form of the metal 714 from the discharge orifice 712. In some implementations, the electric current can be directed into the liquid form of the metal in the nozzle 702, where the electric current can interact with an electric charge of the liquid form of the metal 714 to create an electrohydrodynamic force to eject the liquid form of the metal 714 from the discharge orifice 712. Additionally, or alternatively, the electric current can be directed to an actuator 727 (e.g., a piezoelectric actuator) in contact with the liquid form of the metal 714 such that actuation of the actuator 727 exerts a mechanical force on the liquid form of the metal 714 to ejection the liquid form of the metal 714 from the discharge orifice 712.

In some implementations, the control system 726 can actuate the valve 706 and the electrical power source 709 to switch between pneumatically actuated ejection and electrically actuated ejection based at least in part on a position of the discharge orifice 712 along a controlled three-dimensional patter. As an example, the control system 726 can actuate the valve 706 and the electrical power source 709 for electrically actuated ejection along a border of the controlled three-dimensional pattern or another similar region requiring a high degree of accuracy of placement of liquid metal droplets. As an additional or alternative example, the control system 726 can actuate the valve 706 and the electrical power source 709 for pneumatically actuated ejection along an excursion away from the border (e.g., within an interior space defined by the border) of the controlled three-dimensional pattern or along another similar region requiring less accuracy in placement of liquid metal. More generally, the control system 726 can actuate the valve 706 and the electrical power source to switch between ejection of a stream of the liquid form of the metal 714 (in the pneumatically actuated ejection mode) and ejection of discrete droplets of the liquid form of the metal 714 (in the electrically actuated ejection mode).

FIG. 8 is a flowchart of an exemplary method 800 of switching between pneumatically actuated jetting and electrically actuated jetting of a liquid form of a metal. It should be appreciated that the exemplary method 800 can be carried out using, for example, the three-dimensional printer 700 described above with respect to FIG. 7.

As shown in step 802, the exemplary method 800 can include directing a metal into a volume defined by nozzle. In general, the metal can be directed into the volume according to any one or more of the methods described herein and, thus, can include movement of the metal through the use of any one or more of the media supplies described herein.

As shown in step 804, the exemplary method 800 can include moving a discharge orifice and a build plate relative to one another along a controlled three-dimensional pattern. The discharge orifice can any one or more of the discharge orifices described herein and, thus, can be defined by the nozzle and in fluid communication with the volume. The discharge orifice and the build plate can be moved relative to one another through the use of a robotic system, such as the robotic systems 108 and 708 described above.

As shown in step 806, the exemplary method 800 can include selectively switching between pneumatically actuated ejection and electrically actuated ejection of a liquid form of the metal from the discharge orifice. The selective switching can be, for example, based at least upon a position of the discharge orifice along the controlled three-dimensional pattern. As an example, the selective switching can include selecting electrically actuated ejection along a border of the controlled three-dimensional pattern (e.g., to deliver discrete droplets along the border, where more accuracy may be required to be meet part specifications). Additionally, or alternatively, the selective switching can include selecting pneumatically actuated ejection along an excursion away from the border of the controlled three-dimensional pattern. Such pneumatic ejection can be useful, for example, within the border, where accurate placement of the liquid metal may be less critical. Thus, for example, in such regions within the border, the pneumatic ejection can deliver a constant or substantially constant stream of liquid metal to in-fill the part and, thus, speed up the manufacturing process.

As shown in step 808, the exemplary method 800 can include ejecting the liquid metal from the discharge orifice according to the selected one of the pneumatically actuated ejection and the electrically actuated ejection to form at least a portion of a three-dimensional object.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example and not limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system for pneumatically jetting liquid metal, comprising:
   a nozzle defining a volume and including an open discharge orifice;
   a media source configured to deliver metal to the volume of the nozzle;

a heater configured to heat the metal such that the metal that exits the discharge orifice is liquid metal from a meniscus of liquid metal formed at the open discharge orifice;

a source of pressurized gas in fluid communication with the volume of the nozzle through a first port;

a first valve configured to selectively permit flow of pressurized gas from the source of pressurized gas to the volume of the nozzle through the first port;

wherein when the first valve is in a first position pressurized gas flows to the volume of the nozzle such that a pneumatic force is exerted on the liquid metal in the volume of the nozzle so as to eject an amount of liquid metal through the discharge orifice; and wherein when the first valve is in a second position the flow of pressured gas to the volume of the nozzle is interrupted such that ejection of the liquid metal is interrupted.

2. The system for pneumatically jetting liquid metal of claim 1, further comprising a second port in fluid communication with the volume of the nozzle and configured to, when the first valve is in the second position, vent the pressurized gas from the volume of the nozzle to an environment having a lower pressure than a pressure in the volume of the nozzle.

3. The system for pneumatically jetting liquid metal of claim 1, wherein the nozzle includes at least one baffle disposed in the volume of the nozzle and oriented to direct sediment in the liquid metal toward a reservoir portion of the volume of the nozzle.

4. The system for pneumatically jetting liquid metal of claim 3, wherein the at least one baffle is a plurality of parallel baffles.

5. The system for pneumatically jetting liquid metal of claim 2 further comprising a source of hydraulic inertance having a resistance that dissipates in the presence of a continuous flow of pressurized gas from the volume of the nozzle to the environment having a lower pressure.

6. The system for pneumatically jetting liquid metal of claim 2 further comprising a source of variable hydraulic impedance disposed between the volume of the nozzle and the environment having a lower pressure.

7. The system for pneumatically jetting liquid metal of claim 1 further comprising:

an electric power source configured to apply an electric current to intersect a magnetic field extending through the liquid metal whereby a magnetohydrodynamic force ejects the liquid metal from the discharge orifice.

8. The system for pneumatically jetting liquid metal of claim 7 further comprising a controller configured to cause pneumatic jetting of the liquid metal in a first area designated as requiring high accuracy and configured to cause magnetohydynamic jetting of the liquid metal in a second area designated as a requiring low accuracy.

9. A method of pneumatically jetting liquid metal, comprising:

delivering metal from a media source to a volume of a nozzle, the nozzle including an open discharge orifice;

heating the metal such that the metal that exits the discharge orifice is liquid metal from a meniscus of liquid metal formed at the open discharge orifice;

providing a source of pressurized gas in fluid communication with the volume of the nozzle via a first port;

operating a first valve to permit pressurized gas to flow from the source of pressurized gas to the volume of the nozzle such that a pneumatic force is exerted on the liquid metal in the volume of the nozzle so as to eject an amount of liquid metal through the discharge orifice; and operating the first valve to interrupt the flow of pressured gas to the volume of the nozzle such that ejection of the liquid metal is interrupted.

10. The method of pneumatically jetting liquid metal of claim 9, further comprising the step of:

when the first valve is in the second position, venting the pressurized gas from the volume of the nozzle through a second port to an environment having a lower pressure than a pressure in the volume of the nozzle.

11. The method of pneumatically jetting liquid metal of claim 9 wherein the nozzle includes at least one baffle disposed in the volume of the nozzle and oriented to direct sediment in the liquid metal toward a reservoir portion of the volume of the nozzle.

12. The method of pneumatically jetting liquid metal of claim 11, wherein the at least one baffle is a plurality of parallel baffles.

13. The method of pneumatically jetting liquid metal of claim 10 wherein a source of hydraulic inertance has a resistance that dissipates in the presence of a continuous flow of pressurized gas from the volume of the nozzle to the environment having a lower pressure.

14. The system for pneumatically jetting liquid metal of claim 10 wherein a source of variable hydraulic impedance disposed between the volume of the nozzle and the environment having a lower pressure.

15. The method of pneumatically jetting liquid metal of claim 9, further comprising the step of:

applying an electric current to intersect a magnetic field extending through the liquid metal whereby a magnetohydrodynamic force ejects the liquid metal from the discharge orifice.

16. The method of pneumatically jetting liquid metal of claim 15 wherein a controller is configured to cause pneumatic jetting of the liquid metal in a first area designated as requiring high accuracy and configured to cause magnetohydrodynamic jetting of the liquid metal in a second area designated as a requiring low accuracy.

17. A liquid metal jetting printer for fabricating a three-dimensional object according to a three-dimensional model, comprising:

a build chamber enclosing a build plate, a nozzle and robotics configured to movably position the build plate and the nozzle with respect to one another;

the nozzle defining a volume and including a first port, a second port and an open discharge orifice;

a source of pressured gas in fluid communication with the volume of the nozzle;

a valve configured to selectively allow and interrupt movement of pressured gas from the source of pressurized gas to the volume of the nozzle;

a media source including a drive train configured to feed metal through a heater to the discharge orifice of the nozzle;

a control system configured to cause the robotics to move the build plate and nozzle with respect to one another and selectively operate the valve to control the pneumatic ejection of liquid metal, from a meniscus of liquid metal formed on the open discharge orifice, to form a three-dimensional pattern according to the three-dimensional model.

18. The liquid metal jetting printer of claim 17 further comprising at least one of a baffle, a source of hydraulic inertance, a source of hydraulic impedance and an electrical power source configured to create a magnetohydrodynamic force to eject liquid metal from the discharge orifice of the nozzle.

* * * * *